United States Patent
Chang et al.

(10) Patent No.: US 10,380,479 B2
(45) Date of Patent: *Aug. 13, 2019

(54) ACCELERATION OF CONVOLUTIONAL NEURAL NETWORK TRAINING USING STOCHASTIC PERFORATION

(71) Applicant: INTERNATIONAL BUSINESS MACHINES CORPORATION, Armonk, NY (US)

(72) Inventors: Leland Chang, New York, NY (US); Suyog Gupta, White Plains, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 648 days.

This patent is subject to a terminal disclaimer.

(21) Appl. No.: 14/878,087

(22) Filed: Oct. 8, 2015

(65) Prior Publication Data
US 2017/0103308 A1    Apr. 13, 2017

(51) Int. Cl.
*G06N 7/02* (2006.01)
*G06N 7/04* (2006.01)
(Continued)

(52) U.S. Cl.
CPC .............. *G06N 3/04* (2013.01); *G06N 3/0454* (2013.01); *G06N 3/084* (2013.01)

(58) Field of Classification Search
CPC .......... G06N 3/08; G06N 3/0472; G06N 3/04; G06N 3/0454; G06N 3/084
See application file for complete search history.

(56) References Cited

U.S. PATENT DOCUMENTS 7,219,085 B2 * 5/2007 Buck .................. G06K 9/00986
345/505
7,286,699 B2   10/2007 Simard et al.
(Continued)

OTHER PUBLICATIONS

PerforatedCNNs: Acceleration through Elimination of Redundant Convolutions—Apr. 2015 Figurnov et al.*
(Continued)

*Primary Examiner* — Scott A. Waldron
*Assistant Examiner* — Ababacar Seck
(74) *Attorney, Agent, or Firm* — Cantor Colburn LLP; Rahan Uddin

(57) ABSTRACT

Technical solutions are described to accelerate training of a multi-layer convolutional neural network. According to one aspect, a computer implemented method is described. A convolutional layer includes input maps, convolutional kernels, and output maps. The method includes a forward pass, a backward pass, and an update pass that each include convolution calculations. The described method performs the convolutional operations involved in the forward, the backward, and the update passes based on a first, a second, and a third perforation map respectively. The perforation maps are stochastically generated, and distinct from each other. The method further includes interpolating results of the selective convolution operations to obtain remaining results. The method includes iteratively repeating the forward pass, the backward pass, and the update pass until the convolutional neural network is trained. Other aspects such as a system, apparatus, and computer program product are also described.

6 Claims, 10 Drawing Sheets

(51) Int. Cl.
  *G06N 7/06*   (2006.01)
  *G06N 7/08*   (2006.01)
  *G06N 3/04*   (2006.01)
  *G06N 3/08*   (2006.01)

(56) References Cited

U.S. PATENT DOCUMENTS 9,015,092 B2   4/2015   Sinyavskiy et al.
2007/0047802 A1*  3/2007   Puri .................... G06K 9/4628
                                                     382/157
2010/0183217 A1   7/2010   Seung et al.

OTHER PUBLICATIONS

Fast Training of Convolutional Networks through FFTs—Mar. 2014 Mathieu et al.*
Image based Static Facial Expression Recognition with Multiple Deep Network Learning—Nov. 2015 Yu et al.*
PerforatedCNNs: Acceleration through Elimination of Redundant Convolutions—Apr. 2015 Figurnov et al. (Year: 2015).*
Fast Training of Convolutional Networks through FFTs—Mar. 2014 Mathieu et al. (Year: 2014)*
Image based Static Facial Expression Recognition with Multiple Deep Network Learning—Nov. 2015 Yu et al. (Year: 2015).*
ImageNet Classification with Deep ConvolutionalNeural Networks (Year: 2012).*
Vadim Lebedev, "Fast ConvNets using Group-wise Brain Damage", arXiv: 1506.02515, arxiv.org, 2015.
Leland Chang, et al., "Acceleration of Convolutional Neural Network Training Using Stochastic Perforation", U.S. Appl. No. 14/954,600, filed Nov. 30, 2015.
List of IBM Patents or Patent Applications Treated as Related; (Appendix P), Filed Jan. 27, 2016; 2 pages.

* cited by examiner

ACCELERATION OF CONVOLUTIONAL NEURAL NETWORK TRAINING USING STOCHASTIC PERFORATION

BACKGROUND

The present application relates to computer technology, and more specifically, to training neural networks.

Technical problems such as character recognition and image recognition by a computer are known to be well handled by machine-learning techniques, which typically use neural networks. Neural networks are a class of algorithms based on a concept of inter-connected "neurons." In a typical neural network, neurons have a given activation function that operates on the inputs. By determining proper connection weights (a process also referred to as "training"), a neural network achieves efficient recognition of a desired patterns, such as images and characters. Oftentimes, these neurons are grouped into "layers" in order to make connections between groups more obvious and to each computation of values. Training the neural network is a computationally intense process.

SUMMARY

According to an embodiment, a computer implemented method to train a convolutional neural network includes receiving training data to train the convolutional neural network using one or more convolutional layers. Each convolutional layer includes input maps, convolutional kernels, and output maps. The computer implemented method also includes generating the output maps using a forward pass of a convolutional layer, the forward pass including convolution calculations of the input maps and the convolutional kernels, where the convolution calculations are selectively performed based on a first stochastically generated perforation map. The computer implemented method also includes determining gradients using a backward pass of the convolutional layer, the gradients determined based on a training error and a cost function associated with the convolutional neural network, the backward pass including convolution calculations of the output maps and the convolutional kernels, and where the convolution calculations are selectively performed based on a second stochastically generated perforation map. The computer implemented method also includes updating the convolutional kernels using an update pass of the convolutional layer, the update pass including convolution calculations of the input maps and output maps, where the convolution calculations are selectively performed based on a third stochastically generated perforation map. The computer implemented method includes iteratively repeating the forward pass, the backward pass, and the update pass until the convolutional neural network is trained.

According to another embodiment, a system for training a convolutional neural network includes a memory and a processor. The processor receives training data to train the convolutional network that includes one or more convolutional layers, in which each convolutional layer includes input maps, convolutional kernels, and output maps. The processor also generates the output maps using a forward pass of a convolutional layer, the forward pass includes convolution calculations of the input maps and the convolutional kernels, where the convolution calculations are selectively performed based on a first stochastically generated perforation map. The processor also determines gradients using a backward pass of the convolutional layer, the gradients determined based on a training error and a cost function associated with the convolutional neural network, the backward pass includes convolution calculations of the output maps and the convolutional kernels, and where the convolution calculations are selectively performed based on a second stochastically generated perforation map. The processor also updates the convolutional kernels using an update pass of the convolutional layer, the update pass includes convolution calculations of the input maps and output maps, where the convolution calculations are selectively performed based on a third stochastically generated perforation map. The processor also iteratively repeats the forward pass, the backward pass, and the update pass until the convolutional neural network is trained.

According to another embodiment, a computer product for training a convolutional neural network is described, the computer product includes a computer readable storage medium that includes computer executable instructions to receive training data to train the convolutional network that includes one or more convolutional layers, in which each convolutional layer includes input maps, convolutional kernels, and output maps. The computer product also includes computer executable instructions to generate the output maps using a forward pass of a convolutional layer, the forward pass includes convolution calculations of the input maps and the convolutional kernels, where the convolution calculations are selectively performed based on a first stochastically generated perforation map. The computer product also includes computer executable instructions to determine gradients using a backward pass of the convolutional layer, the gradients determined based on a training error and a cost function associated with the convolutional neural network, the backward pass includes convolution calculations of the output maps and the convolutional kernels, and where the convolution calculations are selectively performed based on a second stochastically generated perforation map. The computer product also includes computer executable instructions to update the convolutional kernels using an update pass of the convolutional layer, the update pass includes convolution calculations of the input maps and output maps, where the convolution calculations are selectively performed based on a third stochastically generated perforation map. The computer product also includes computer executable instructions to iteratively repeat the forward pass, the backward pass, and the update pass until the convolutional neural network is trained.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed here are technical solutions for accelerating training of convolutional neural networks. The technical solutions include stochastic perforation of a convolutional layer to reduce computations. The technical solutions have been tested to demonstrate a net training speedup of at least 2× using 50% perforation rate with no adverse impact on a final test error rate for a particular test case. The results may vary for other test cases.

The technical solutions described herein improves training speed while mitigating degradation in training performance (test error) by stochastic adjustment of perforation maps, which emulates regularization. Further, the described technical solutions use a convolution-operation-based perforation strategy to contain error propagation. Thus, the technical solutions yield similar training performance to full convolution at a substantial speedup, and in an example test, demonstrate a ~2× speedup on a CIFAR-10 image recognition task with negligible test error increase. Further yet, the technical solutions described are orthogonal to other methods that are used to accelerate convolutions, and thus may be used in an additive manner.

The technical solutions described herein facilitate gain in efficiencies of deep learning techniques that use convolutional neural networks. Deep learning techniques are widely used in machine-based pattern recognition problems, such as image and speech recognition. Deep learning inherently leverages the availability of massive training datasets (that are enhanced with the use of Big Data) and compute power (that is expected to grow according to Moore's Law).

The use of neural networks, particularly with convolutional layers, has driven progress in deep learning. Such neural networks are referred to as convolutional neural networks (CNN). In a CNN, kernels convolute overlapping regions in a visual field, and accordingly emphasize the importance of spatial locality in feature detection. Computing the convolutional layers of the CNN, typically, encompasses more than 90% of computation time in neural network training and inference. The training for example, depending on the size of the training dataset that is being used, may be a week or longer. Thus, accelerating the CNN training, as described by the examples of the technical solutions herein, is a desirable improvement.

Figure 1:
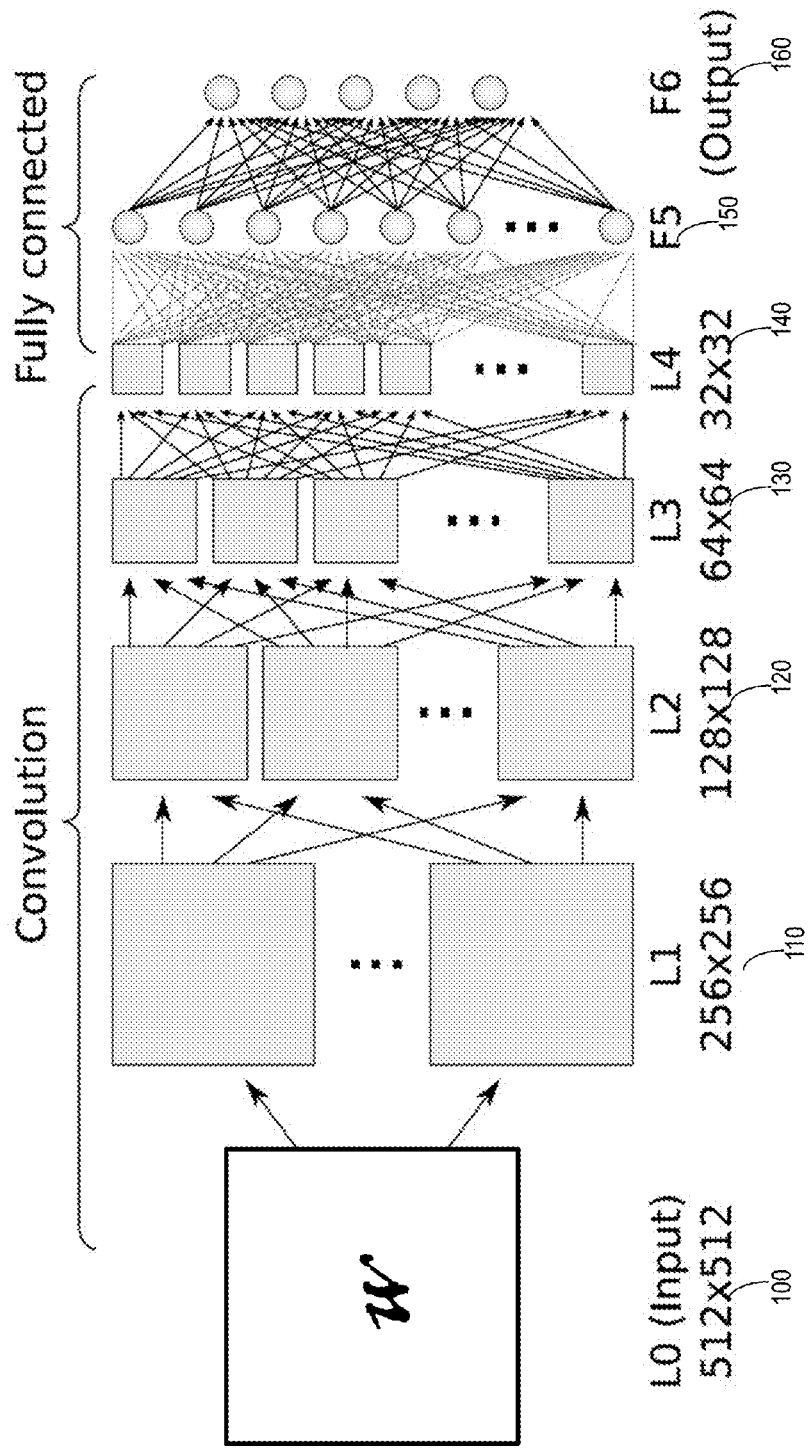
FIG. 1 illustrates a simplified block diagram of a convolutional neural network (CNN) in accordance with an embodiment.

FIG. 1 illustrates a simplified block diagram of a neural network, which is interpreting a sample input map 100. This particular example uses a handwritten letter "w" as an input map, however, it is understood that other types of input maps are possible. In the illustrated example, the input map 100 is used to create a set of values for the input layer 110, or "layer-1." For example, layer-1 may be generated by direct mapping of a pixel of the sample input map 100 to a particular neuron in layer-1, such that the neuron shows a 1 or a 0 depending on whether the pixel exhibits a particular attribute. Another example method of assigning values to neurons is discussed below with reference to convolutional neural networks. Depending on the vagaries of the neural network and the problem it is created to solve, each layer of the network may have differing numbers of neurons, and these may or may not be related to particular qualities of the input data.

Referring to FIG. 1, neurons in layer-1 110 are connected to neurons in a next layer, layer-2 120. In a neural network, each of the neurons in a particular layer is connected to neurons in the next layer. A neuron in layer-2, consequently, receives an input value from each of the neurons in layer-1. The input values are then summed and this sum compared to a bias. If the value exceeds the bias for a particular neuron, that neuron then holds a value which can be used as input to neurons in the next layer of neurons. This computation continues through the various layers 130-150 of the neural network, until it reaches a final layer 160, referred to as "output" in FIG. 1. In an example of a neural network used for character recognition, each value in the layer is assigned to a particular character. The network is configured to end with the output layer having only one large positive value in one neuron, which then demonstrates which character the network has computed to be the most likely handwritten input character.

The data values for each layer in the neural network is typically represented as matrices (or tensors in some examples) and computations are performed as matrix computations. The indexes (and/or sizes) of the matrices vary from layer to layer and network to network, as illustrated in FIG. 1. Different implementations orient the matrices or map the matrices to computer memory differently. Referring to FIG. 1, in the example neural networks illustrated, each level is a matrix of neuron values, as is illustrated by matrix dimensions for each layer of the neural network. The values in a matrix at a layer are multiplied by connection strengths, which are in a transformation matrix. This matrix multiplication scales each value in the previous layer according to the connection strengths, and then summed. A bias matrix is then added to the resulting product matrix to account for the threshold of each neuron in the next level. Then a activation function is applied to each resultant value, and the resulting values are placed in the matrix for the next layer. In an example, the activation function may be rectified linear units, sigmoid, or tanh( ). Thus, as FIG. 1 shows, the connections between each layer, and thus an entire network, can be represented as a series of matrices. Training the neural network includes finding proper values for these matrices.

While fully-connected neural networks are able, when properly trained, to recognize input patterns, such as handwriting, they may fail to take advantage of shape and proximity when operating on input. For example, since every pixel is operated on independently, the neural network may ignore adjacent pixels. A CNN, in comparison, operates by associating an array of values, rather than a single value, with each neuron. Conceptually, the array is a subset of the input pattern, or other parts of the training data. The transformation of a neuron value for the subsequent layer is generated using convolution. Thus, in a CNN the connection strengths are convolution kernels rather than scalar values as in a full-network.

Figure 2:
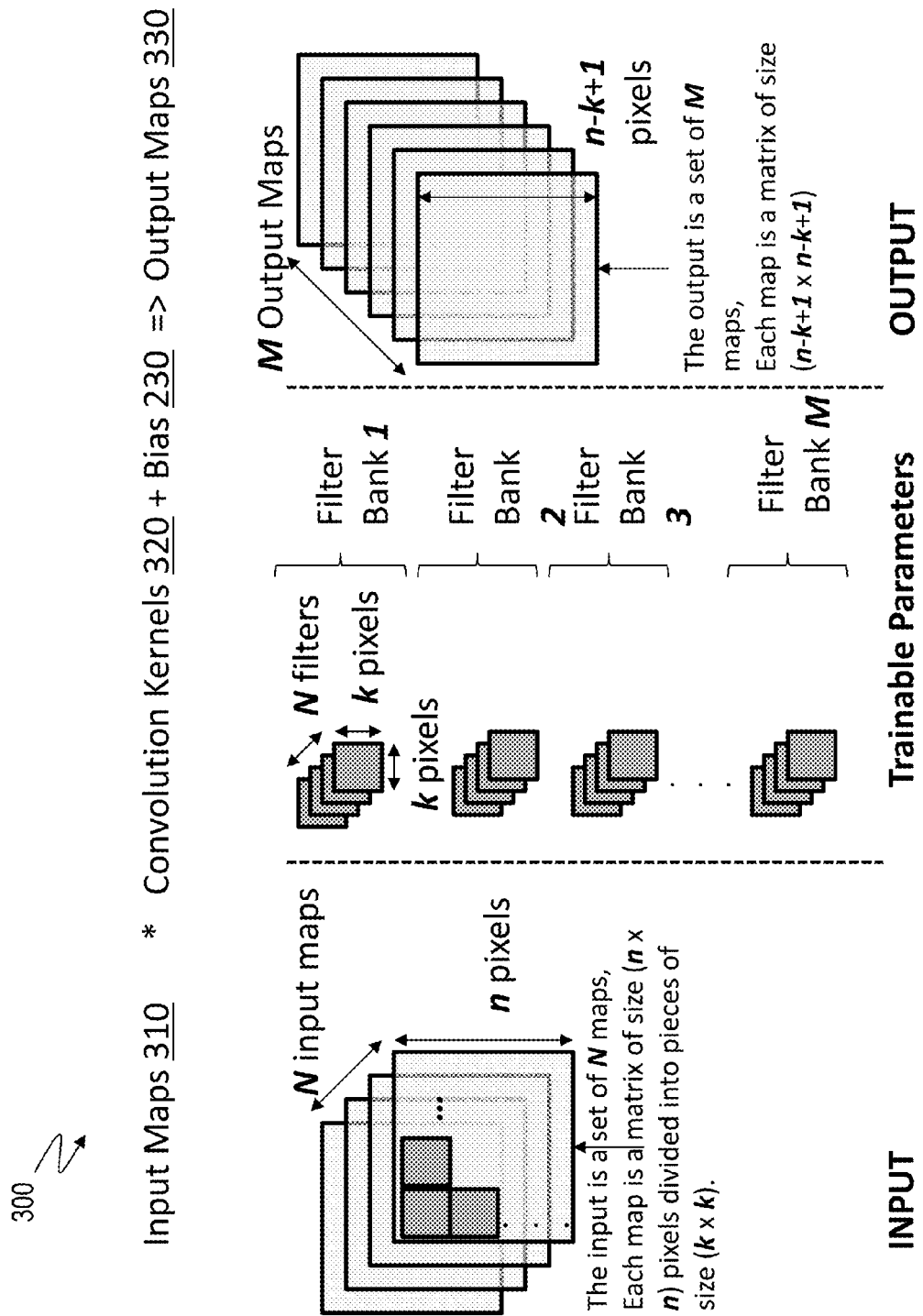
FIG. 2 illustrates an example convolutional layer of a neural network being trained using training data, in accordance with an embodiment.

FIG. 2 illustrates an example convolutional layer 300 in a CNN being trained using training data that includes input maps 310 and convolution kernels 320. For simplicity, FIG. 2 does not illustrate the bias matrices. The input maps 310 may include multiple input patterns, for example N input maps. Each input map is a matrix, such as a square matrix of size n×n. The input maps are convolved with convolution kernels 320 of size k×k as illustrated to produce M output maps 330 of size n−k+1×n−k+1. Each convolution is a 3D convolution involving the N input maps. It should be noted that the input maps, kernels, and output maps need not be square. A CNN can include multiple such layers, where the output maps 330 from a previous layer are used as input maps 310 for a subsequent layer. The backpropagation algorithm can be used to learn the weight values of the k×k×M×N filters.

For example, the input maps 310 are convolved with each filter bank to generate a corresponding output map. For example, in case the CNN 300 is being trained to identify handwriting, the input maps 310 are combined with a filter bank that includes convolution kernels representing a vertical line. The resulting output map identifies vertical lines which may be present in the input maps 310. Further, another filter bank may include convolution kernels representing a diagonal line, such as going up and to the right. An output map resulting from a convolution of the input maps 310 with the second filter bank identifies samples of the training data that contain diagonal lines. The two output maps show different information for the character, while preserving pixel adjacency. This can result in more efficient character recognition.

Figure 3:
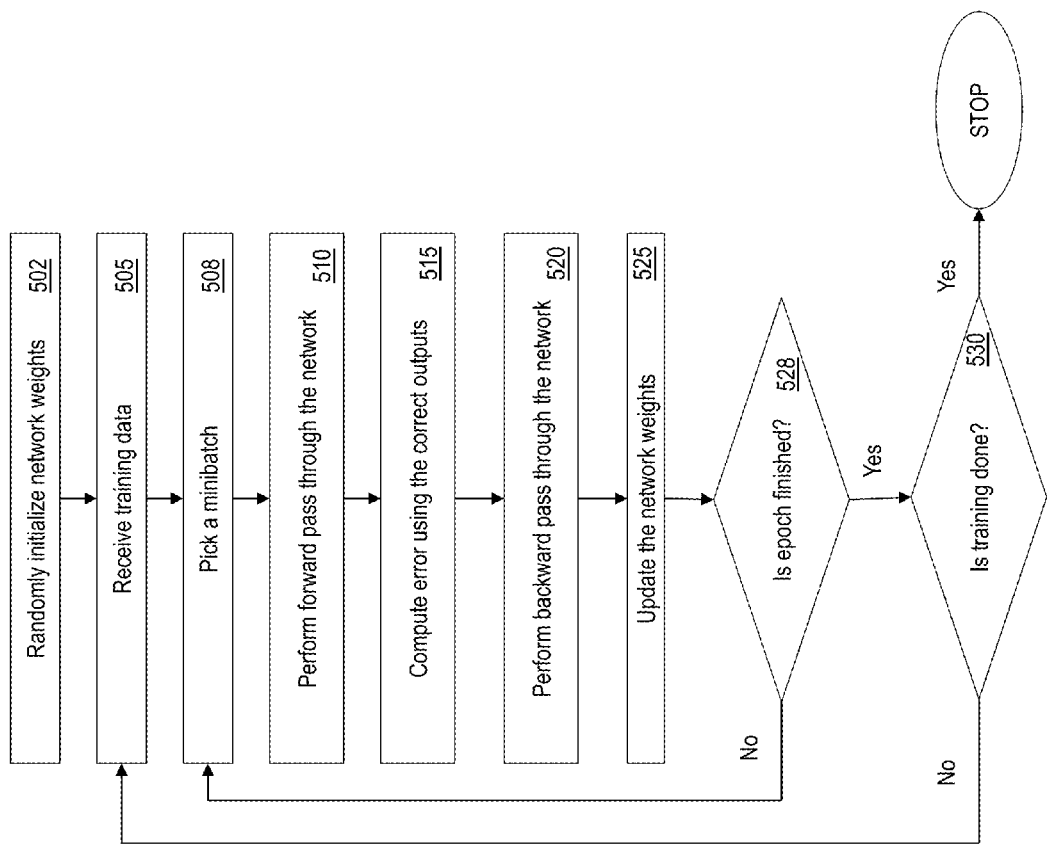
FIG. 3 illustrates an example flowchart for training a neural network, in accordance with an embodiment.

FIG. 3 illustrates an example flowchart for training a CNN with one or more convolutional layers 300. The example logic may be implemented by a processor, such as a central processing unit (CPU), a graphics processing unit (GPU), a digital signal processor (DSP), or any other processor or a combination thereof. The CNN may be initialized using random weights for the neurons, as shown at block 502. The training data for the CNN 300 is received, as shown at block 505. In an example, the CNN may be pre-set with sample convolutional kernels and biases, which are refined to give consistent and efficient results. The training data typically includes many (on the order of tens of thousands) input training samples 100, which are associated with an expected output 160. For example, the inputs 100 may be samples of handwritten samples and the expected outputs 160 may be an indication of the correct character each should be interpreted as.

The CNN training may include multiple training epochs. Each epoch may include several mini-batches. Accordingly, the processor begins at a mini-batch of a training epoch, as shown at block 508. Using the input maps 310 and the convolutional kernels 320, the output maps 330 are generated as described herein, as shown at block 510. Generating the output maps 330 is commonly referred to as a "forward pass." The processor, using the output maps 330 calculated, determines how close or far off of the expected character recognition and the CNN was, as shown at block 515. A degree of error with relation to each of the matrices which comprise the CNN is determined, such as using a gradient descent. Determining the relative errors is referred to as a "backward pass." The matrices are then modified to adjust for the error, as shown at block 525. The adjusting the convolution kernels 320 based on the output error information and using it to determine modifications for each neural network matrix, is referred to as an "update pass." The modified convolutional kernels 320 after being adjusted may be used for a next minibatch or epoch of the training, unless the training is deemed completed, as shown at block 530. In an example, the modified convolutional kernels 320 from one mini-batch may be used in a subsequent mini-batch. For example, the training may be deemed completed if the CNN identifies the inputs according to the expected outputs with a predetermined error threshold. If the training is not yet completed, the CNN another training epoch is performed using the modified convolutional kernels.

In an example, each iteration of the forward and backward pass uses the entire training data. Alternatively, the training data may be divided into mini-batches, or subsets. In a batched training process, the CNN is propagated on a forward pass to determine an output for a mini-batch, as shown at 510. The error function is used to compute how far off the CNN was from the expected output for the batch, as shown at block 515. A gradient function is determined for the error function. The gradient function, in an example, includes partial derivatives for each entry of each neural network matrix with respect to the error. The gradient function represents how much to adjust each matrix according to the gradient descent method. The processor subsequently modifies the matrices, including the convolutional kernels and the biases, according to the gradient function, as shown at block 525. As shown at block 530, the forward-pass/backward-pass are repeated as long as there are more mini-batches and/or the CNN is not trained. The mini-batch may include any fraction of the total number of input samples needed to complete a training epoch.

Thus, according to the CNN training above, the CNN learns to model a dependency between the inputs and the expected outputs in the training data. Mathematically, for a vector of input maps S and a vector of outputs X, the CNN learns a model to reduce an error E between S and X. One such error function is the mean square error between S and X, for example:

$$E = \Sigma_t \|f(S(t)) - X(t)\|^2$$

Other error functions can include, for example, cross-entropy or logistic loss.

The CNN, for each layer, adapts a matrix of weights A and a vector of biases a to optimize E. To this end, in the forward pass, a value for each value of a next layer (B, b) is calculated using values of the current layer (A, a). For example, the computations in the forward pass for a layer may be represented as $X = f(S) = B\varphi(AS+a)+b$, where, A is the matrix of weights of a current layer, a is a bias vector of the current layer, and B and b are weight matrix and bias of the next layer of the CNN. The function $\varphi$ represents an element-wise non-linear relation. In the forward pass, the predicted outputs corresponding to the inputs are evaluated according to the above equation. In the backward pass, partial derivatives of the cost function (E) with respect to the different parameters are propagated back through the CNN. The network weights are then be updated using a gradient-based optimization algorithm, such as the gradient descent. The whole process is iterated until the weights have converged. This approach is computationally rather intensive. Training a CNN in the above method is a time consuming process since the forward, backward, and update passes involve convolution operations.

Figure 4:
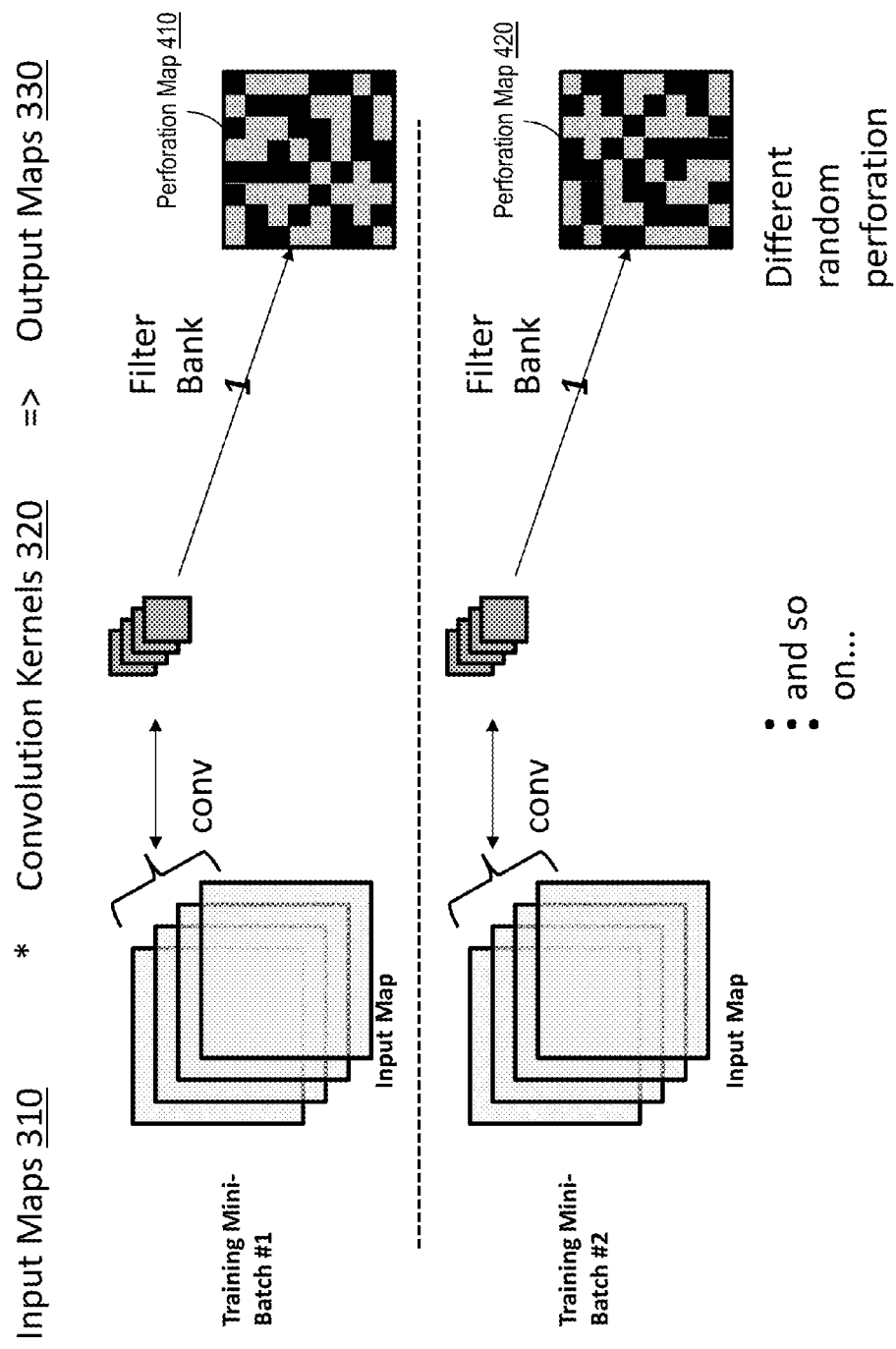
FIG. 4 illustrates the use of stochastic perforation maps when performing the convolution operations, in accordance with an embodiment.

The convolution operations include redundant computations. The technical solutions described herein facilitate reducing the redundancy by skipping subset of the calculations in the convolution operations. The results of the calculations skipped are obtained by interpolating results from neighboring spatial positions in the matrices. For example, FIG. 4 illustrates using perforation maps 410 and 420 when performing the convolution operations to generate the output maps 330. For example, when calculating values for each layer, the outputs of only a selected subset of spatial positions are calculated using the convolutional operations. The remaining values are obtained by interpolating the results of the convolutions. For example, to calculate a result for a spatial position that is to be skipped according to the perforation maps 410 and 420, values of the nearest neighbors according to Euclidean distance are interpolated.

For example, the perforation map 410 identifies the spatial positions in the convolutional layer output maps 330, for which the convolutional operations are performed. Alternatively, in an example, the perforation map 410 identifies the spatial positions for which, the interpolations are to be performed. Typically, the processor performs the interpolation much more efficiently than the convolution operation. Accordingly, by reducing the number of convolutional operations, using the perforation map 410 increases the efficiency of training the CNN, and consequently speeds up the training process.

The perforation map 410 may be generated by the processor. The perforation map 410 may be generated in of different ways. For example, a uniform perforation map is P points chosen randomly. Alternatively, a grid perforation map may identify a set of evenly scattered points. Alternatively, the perforation map 410 may be generated randomly choosing the origin for a gridded perforation map. Various other types of perforation maps may be generated. In addition, the perforation map 610 may be generated using fully random to directed/gridded perforation patterns.

Using the perforation map 410 and reducing the number of convolution operations may degrade the performance (increase error rate) of the CNN. Hence, the technical solutions described herein use different perforation maps in different phases of the training. Further, the technical solutions randomize the perforation maps used during training. The randomization ensures that a majority, if not all connections are trained when averaged over multiple training epochs, since the perforation map 410 is no longer fixed. During iterative training of a neural network, an epoch is a single pass through the entire training set, followed by testing of the verification set. The randomization also injects noise to improve training via stochastic gradient decent.

In an example, overhead of generating the randomized perforation maps is amortized by changing the perforation map for every mini-batch, so that a first perforation map is used for a first group of training data input maps and a second perforation map is used for a second group of training data input maps. The technical solutions' use of perforation maps in this manner uses stochasticity to aid convergence in iterative machine learning problems, and thus facilitate training speedup of the CNN without test error degradation.

Figure 5:
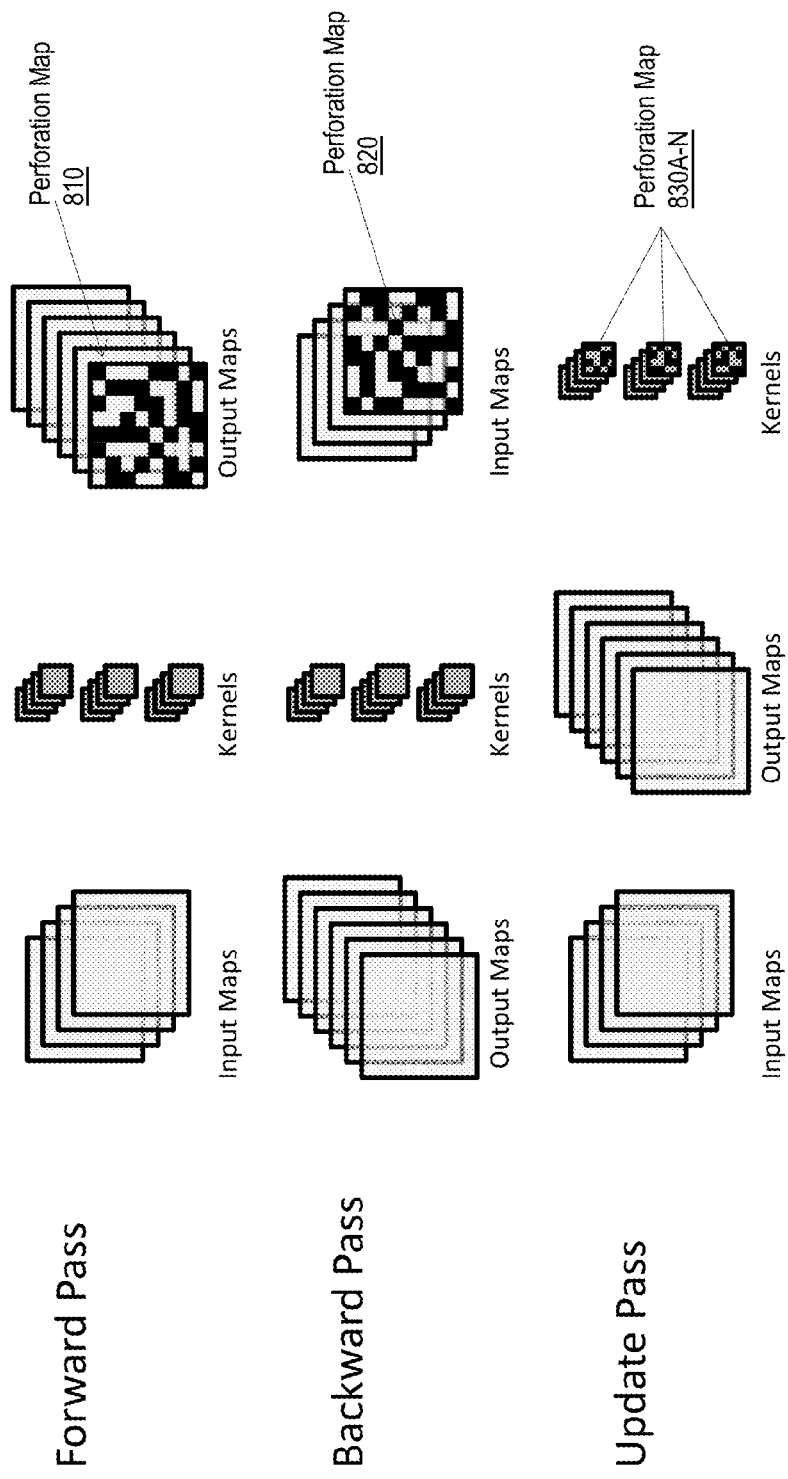
FIG. 5 illustrates the use of stochastic perforation maps across forward, backward, and update steps when training a CNN, in accordance with an embodiment.

FIG. 4 illustrates an example where each mini-batch uses different perforation maps. For example, a first mini-batch uses the perforation map 410 and the second mini-batch uses a perforation map 420. Both, the perforation map 410 and the perforation map 420 are different from each other, and are generated stochastically. Alternatively or in addition, in another example, the perforation maps 410 and 420 may include multiple perforation maps, such that a different perforation map is used for different steps (forward, backward, and update). FIG. 5 illustrates use of stochastic perforation maps in a given mini-batch. For example, the forward pass uses a perforation map 810 on the output map (output of forward convolution), the backward pass uses a perforation map 820 on the input map (output of backward convolution), the two perforation maps being different from each other. In another example, the system uses different perforation maps 830A-N in the update pass for updating each respective convolution kernel from the convolution kernels 320. For example, the input maps 310 and the output maps 330 are used to update the convolution kernels 320 according to the gradient descent using the perforation maps 830A-N, which are different from the perforation maps 810 and 820. In yet another example, each pass of each mini-batch uses different perforation maps that may be generated stochastically at the beginning of each pass.

Accordingly, each phase in the training uses a different perforation map, which may be stochastically generated. For example, the CNN training uses separate perforation maps for output of each convolution operation. The perforation maps used in each pass of the CNN training are distinct from each other. Further yet, the perforation maps used for each mini-batch may be distinct from each other. For example, if a single perforation map is used, the same spatial locations in the training data set are interpolated when calculating the output maps 330 in the forward pass as well as when adjusting the input maps 310 and the convolutional kernel 320 in the backward pass. This may propagate the error at those spatial locations during each iteration and/or epoch when training the CNN. Instead, as described herein, the technical solutions use different stochastically generated perforation maps for each phase of training, and thus reduce the error propagation. Further, using a constant perforation map across all phases of the training reduces stochasticity of the perforation, that is selection of which spatial locations to perform the convolution operations for and which spatial locations to perform the interpolations for. Thus, using different perforation maps for each phase of training (forward and backward pass), the error is constrained only to the spatial locations according to the perforated convolution outputs and further enhances stochasticity of the training. As a result, using the different perforation maps reduces test error degradation.

Figure 6:
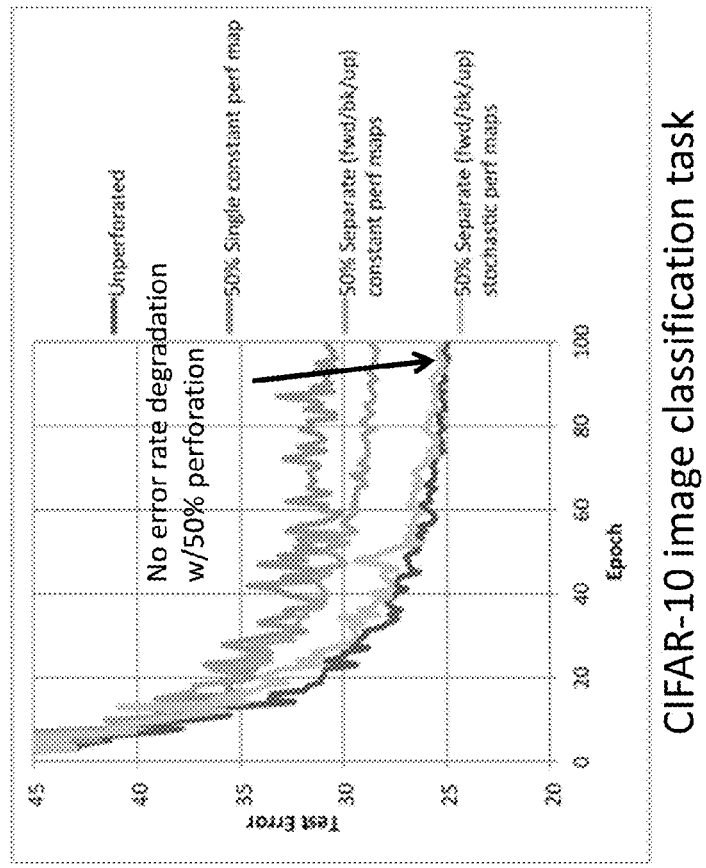
FIG. 6 compares test-error rates for different perforation schemes at 50% perforate rate, in accordance with an embodiment.

FIG. 6 compares test-error rates for different perforation schemes, including constant vs. stochastic perforation maps and the use of a single perforation map for forward, backward, and update vs. three separate perforation maps. As can be seen, stochastic (per mini-batch of 100 samples) and separate perforation maps yields comparable result to unperforated case. In this example, the perforation maps generated stochastically used a 50% perforation rate.

Further, to enhance the results of the training using the perforation maps per training phase, the technical solutions adjust hyperparameters of the CNN training. For example, hyperparameters may include, but are not limited to parameters associated with a learning rate, network architecture, regularization parameters, and optimization algorithms used to train the neural network. For example, regularization parameters, which are used to avoid statistical overfitting by the CNN, may include an L1 (LASSO) or an L2 (Ridge) norm parameters that regularize the convolutional kernels 320. The L2 parameter may be adjusted to a predetermined value when using separate perforation maps. The predetermined value may be based on the degree of perforation being used when generating the perforation maps.

Figure 7:
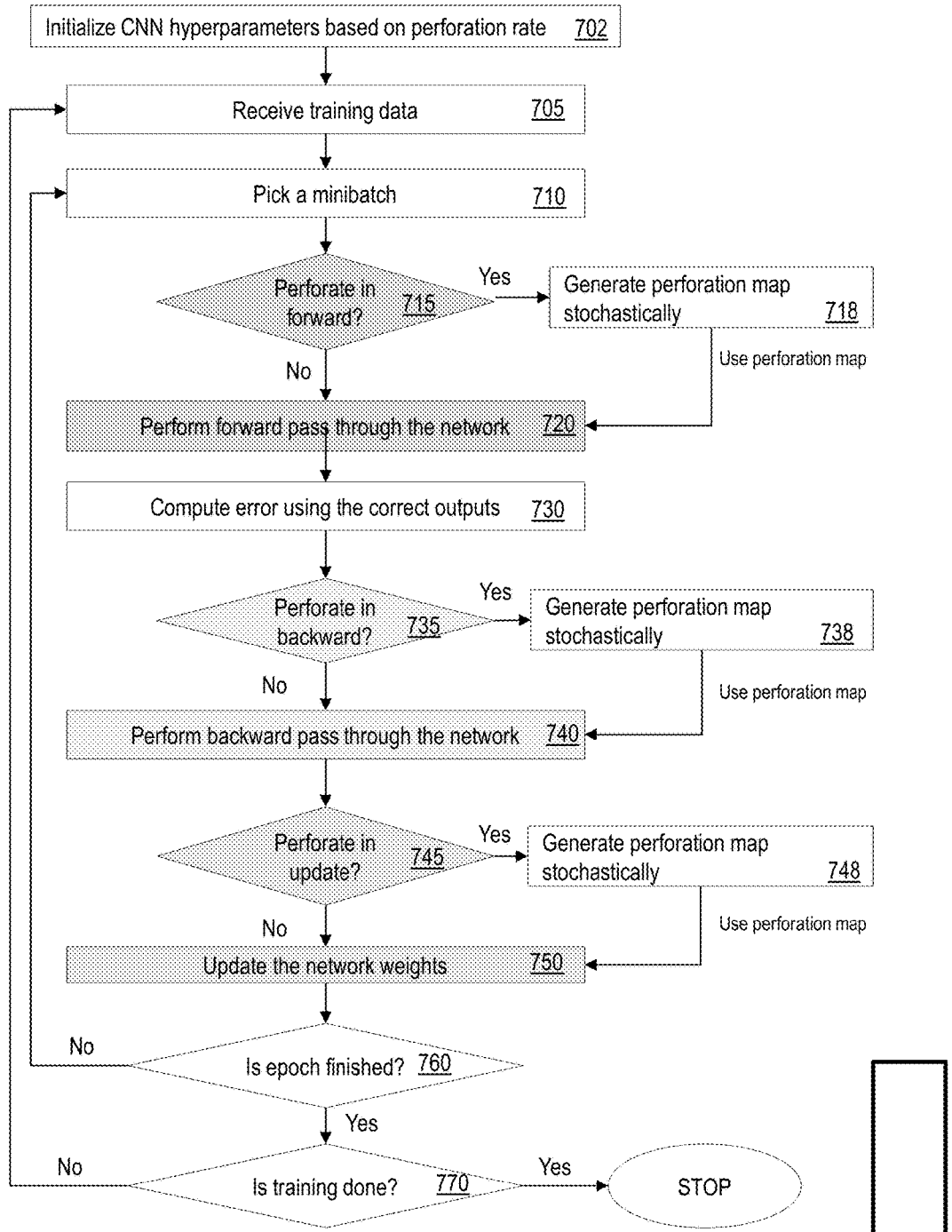
FIG. 7 illustrates an example flowchart for CNN training using stochastic perforation maps according to an embodiment.

FIG. 7 illustrates an example flowchart of CNN training using separate stochastic perforation maps according to an embodiment. The example flowchart may be implemented by a processor when training the CNN. The example flowchart includes receiving the training data for training the CNN, as shown at 705. The CNN training picks a mini-batch to perform training on, as shown at block 710. In an example, the CNN training determines if the forward pass is to be performed using a perforation, as shown at block 715. If the forward pass is to be perforated, the CNN training generates a first perforation map, as shown at 718. The first perforation map may be generated stochastically. If the forward pass is to be perforated, the CNN training uses the first perforation map to select the spatial locations in the training data for which convolutional operations are to be performed during the forward pass, as shown at block 720. The forward pass results for the rest of the spatial locations in the training data set are obtained by interpolating the results of the convolutional operations. Alternatively, if the forward is not perforated, the forward pass is performed without a perforation map, that is all convolutional operations are performed in the forward pass, at block 720. Relative errors, based on the output are computed, as shown at block 730. The CNN training determines if the backward pass is to be performed using a perforation, as shown at block 735. If the backward pass is to be perforated, the CNN training generates a second perforation map, as shown at 738. The second perforation map is generated stochastically to select the spatial locations to perform convolutional operations during the backward pass of the CNN training, as shown at 740. If the backward pass is not to be perforated, the backward pass is performed without the perforation map, at block 740. It is further determined if the update pass is to be perforated, as shown at block 745. If the update pass is to be perforated additional perforation maps are generated stochastically, as shown at block 748, which are then used for the convolutional operations of the update pass, as shown at block 750. Alternatively, if the update pass is not to be perforated, all the convolutional operations of the update pass are performed, at block 750. The system determines if additional training epochs are to be performed, as shown at block 760. If this was the final training epoch, the CNN training is completed. In different examples, the perforation maps may be generated per epoch, per mini-batch, or per training example.

Figure 8:
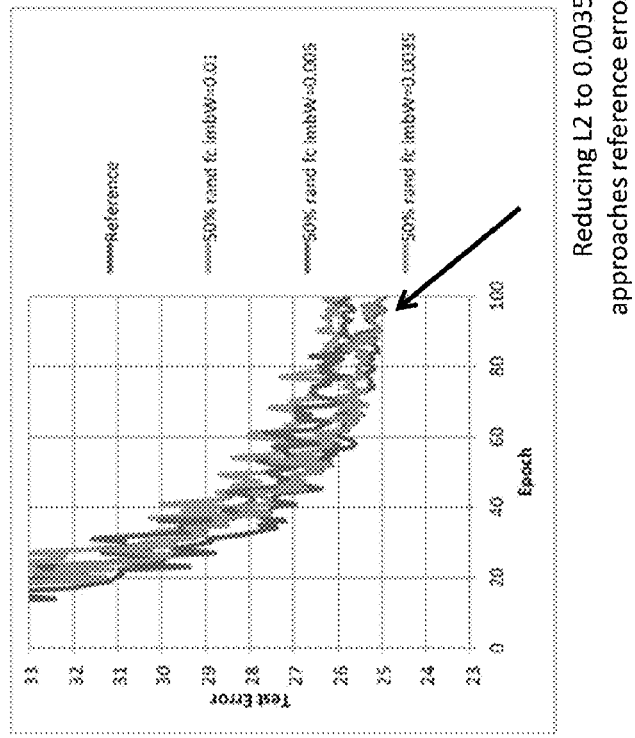
FIG. 8 illustrates effects of hyperparameters when training a CNN, in accordance with an embodiment.

In an example, the CNN training includes adjusting regularization parameters of the system according to perforation degree and reference error rate, as shown at 702. For example, if the perforation rate is 50%, the regularization parameters may be set to a first value, whereas if the perforation rate is 75%, the regularization parameters may be set to a second value. FIG. 8 illustrates effects of different regularization parameter L2 values when using perforated training, using a particular (50%) perforation rate.

Figure 9:
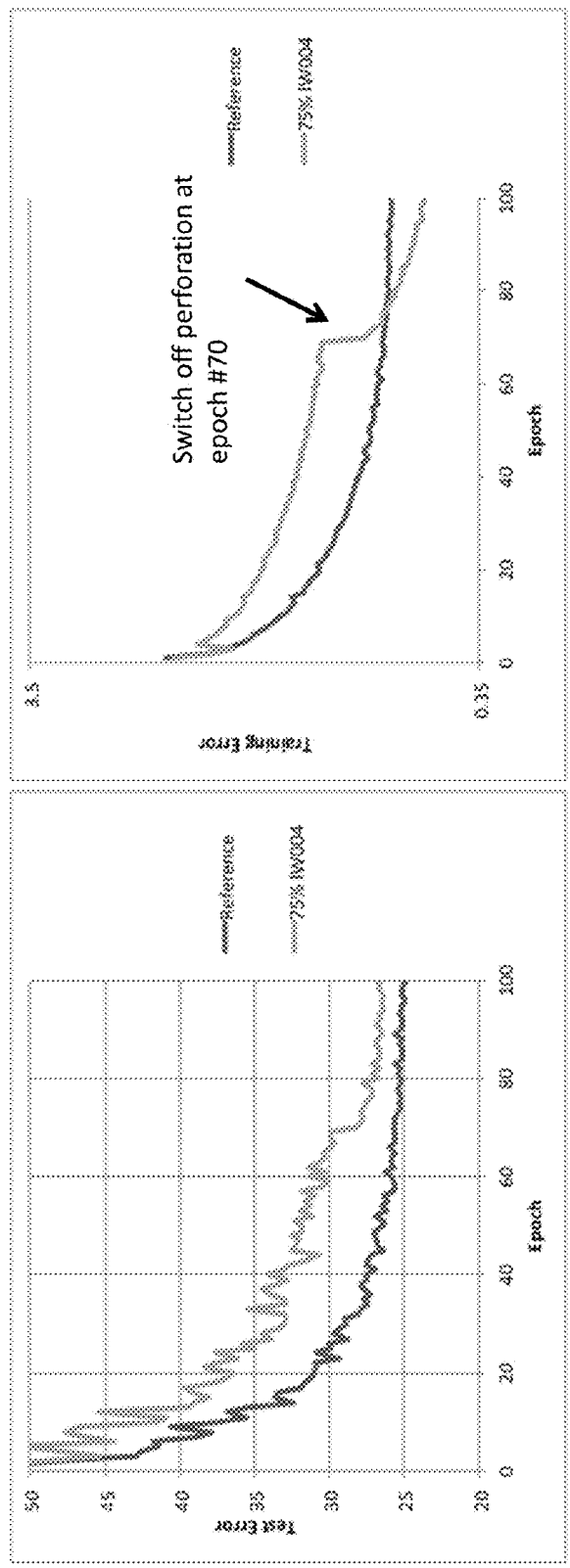
FIG. 9 illustrates example results using selective perforation for different training epochs, in accordance with an embodiment.

In another example the CNN training may selectively utilize perforation in different epochs to balance performance speedup and test error rate. For example, the CNN training may turn off perforation in later training epochs. In such a case, the system speeds up the CNN training in initial epochs without significant error propagation, and in the later epochs performs unperforated convolutional operations to inhibit any further error propagation. For example, at high perforation rates, such as 75%, the test error rate may degrade. Accordingly, the CNN training system, may determine if perforation is to be used for a particular training epoch. If perforation is to be used, the CNN training epoch proceeds as described herein with reference to FIG. 7 with every pass being perforated. Alternatively, if perforation is not to be used, the system proceeds with the forward pass, the backward pass, and the update pass without perforation. FIG. 9 illustrates reduction in test error rate when inhibiting the perforation at a predetermined epoch. The epoch at which the perforation is to be inhibited is predetermined based on the perforation rate (for example epoch 70 for perforation rate 75%). The epoch at which to inhibit the perforation may be based on other factors in other examples. In another example, the CNN training uses unperforated convolution in first few epochs to aid convergence, uses stochastic perforation in the intermediate epochs, and uses unperforated convolution in last few epochs to minimize test error.

Using the techniques described herein, the technical solutions speed up convolution evaluation, and improves test error rate faster as a function of training time. In an exemplary test case, the techniques described herein demonstrated a 2× speedup for 50% perforation and a 4× speedup for 75% perforation. Further, the test error was negligibly degraded in comparison to the reference error rate. Thus, the technical solution reduces test error degradation while still harnessing speedup of perforation of the convolutional operations. By using separate perforation maps for the different phases, stochasticity of the training is enhanced and further error propagation is reduced. Further, overhead costs of generating each random perforation map are amortized across multiple training samples by using varying the perforation maps across batches. In an example, the perforation maps may be used for some or all of the forward and backward pass convolution steps. Additionally or alternatively, the stochastic perforation maps may be used for some or all epochs of the training. In addition, in an example the hyperparameters may be adjusted to compensate for effective regularization created by stochastic perforation.

Figure 10:
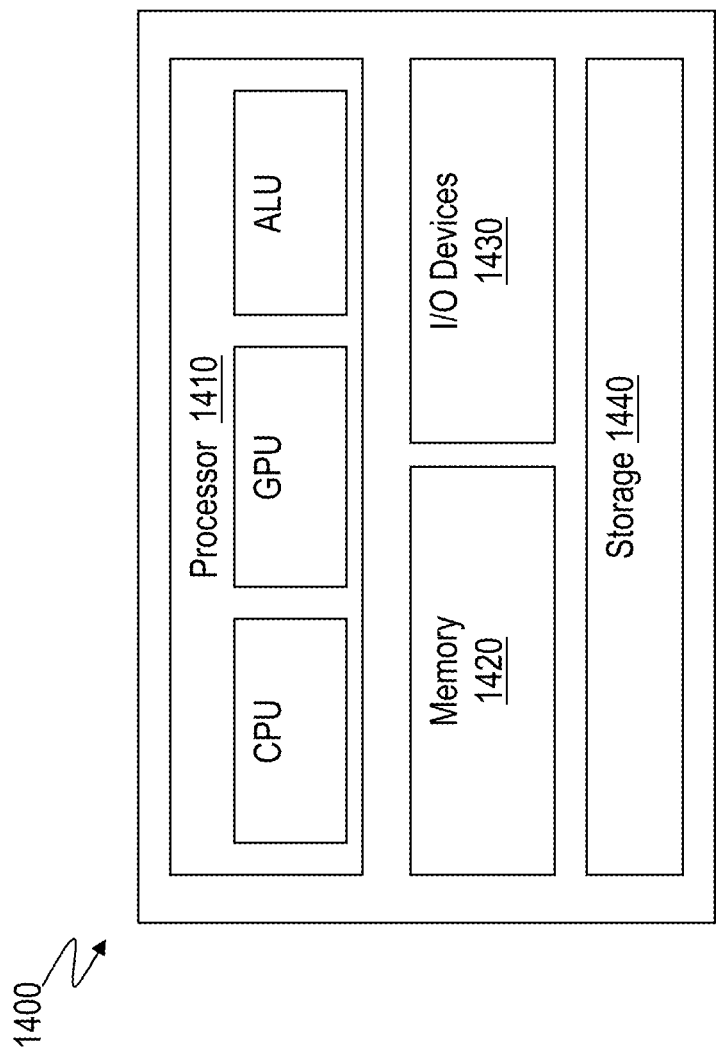
FIG. 10 illustrates a CNN training system, in accordance with an embodiment.

The CNN training may be performed by a CNN training system 1400 such as that illustrated in FIG. 10. Among other components, the CNN training system 1400 includes a processor 1410, a memory 1420, Input/Output devices 1430, and a storage 1440.

The processor 1410 may be a central processor of the CNN training system 1400 responsible for execution of an operating system, control instructions, and applications installed on the CNN training system 1400. The processor 1410 may be one or more devices operable to execute logic. The logic may include computer executable instructions or computer code embodied in the memory 1420 or in other memory that when executed by the processor 1410, cause the processor 1410 to perform the features implemented by the logic. The computer code may include instructions executable with the processor 1410. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. The processor 1410 may be a general processor, central processing unit, server, application specific integrated circuit (ASIC), digital signal processor, field programmable gate array (FPGA), digital circuit, analog circuit, a Graphics Processing Unit (GPU), or combinations thereof. The processor 1410 may be in communication with the memory 1420 and the other components of the CNN training system 1400.

The memory 1420 may be non-transitory computer storage medium. The memory 1420 may be DRAM, SRAM, Flash, or any other type of memory or a combination thereof. The memory 1420 may store control instructions and applications executable by the processor 1410. The memory 1420 may contain other data such as images, videos, documents, spreadsheets, audio files, and other data that may be associated with operation of the CNN training system 1400.

The CNN training system 1400 includes storage 1440, one or more input devices 1430, one or more output devices 1430, and one or more communication connections (not shown). The storage 1440 may be removable or non-removable, and includes magnetic disks, magnetic tapes or cassettes, CD-ROMs, CD-RWs, DVDs, or any other medium which can be used to store information and which can be accessed within the CNN training system 1400. The storage 1440 stores instructions for the software implementing the described neural network training techniques. The input device(s) 1430 may be a touch input device such as a keyboard, mouse, pen, or trackball, a voice input device, a scanning device, or another device that provides input to the CNN training system 1400. For audio, the input device(s) 1430 may be a sound card or similar device that accepts audio input in analog or digital form, or a CD-ROM reader that provides audio samples to the computing environment. The output device(s) 1430 may be a display, printer, speaker, CD-writer, or another device that provides output from the CNN training system 1400.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A system for training a convolutional neural network, the system comprising:
   a memory; and
   a processor configured to:
      receive training data to train the convolutional neural network that comprises one or more convolutional layers, in which each convolutional layer comprises input maps, convolutional kernels, and output maps;
      create a first perforation map for optimizing a convolution evaluation by filtering calculations used to generate the output maps using a forward pass of a convolutional layer, the forward pass comprises a first set of convolution calculations of the input maps and the convolutional kernels, wherein for filtering the calculations the convolution calculations are selectively performed based on the first perforation map, the first perforation map indicates a first subset of the first set of convolution calculations to be performed and a second subset of the first set of convolution calculations to be skipped, the first perforation map is stochastically generated;
      create a second perforation map for optimizing the convolution evaluation by filtering calculations used to determine gradients using a backward pass of the convolutional layer, the gradients determined based on a training error and a cost function associated with the convolutional neural network, the backward pass comprises a second set of convolution calculations of the output maps and the convolutional kernels, and wherein for filtering the calculations the convolution calculations are selectively performed based on the second perforation map, the second perforation map indicates a first subset of the second set of convolution calculations to be performed and a second subset of the second set of convolution calculations to be skipped, the second perforation map is stochastically generated, and the second perforation map being distinct from the first perforation map;
      create a third perforation map for optimizing the convolution evaluation by filtering calculations used to update the convolutional kernels using an update pass of the convolutional layer, the update pass comprises a third set of convolution calculations of the input maps and output maps, wherein for filtering the calculations the convolution calculations are selectively performed based on the third perforation map, the third perforation map indicates a first subset of the third set of convolution calculations to be performed and a second subset of the third set of convolution calculations to be skipped, the third perforation map is stochastically generated, and the third perforation map being distinct from the first perforation map and the second perforation map; and
      iteratively repeat the forward pass, the backward pass, and the update pass until the convolutional neural network is trained, the first perforation map, the second perforation map, and the third perforation map being different for each iteration.

2. The system of claim 1, wherein the processor is further configured to perform the first set of convolution calculations of the forward pass, the second set of convolution calculations of the backward pass, and the third set of convolution calculations of the update pass using mini-batches of the training data, wherein a mini-batch of the training data comprises a subset of the training data.

3. The system of claim 2, wherein:
   wherein the first perforation map is a plurality of first perforation maps, wherein the forward pass uses a respective stochastically generated perforation map from the first perforation maps for each training sample;
   the second perforation map is a plurality of second perforation maps, wherein the backward pass uses a respective stochastically generated perforation map from the second perforation maps for each training sample; and
   the third perforation map is a plurality of third perforation maps, wherein the update pass uses a respective stochastically generated perforation map from the third perforation maps for each training sample.

4. A computer product for training a convolutional neural network, the computer product comprising a computer readable storage medium that comprises computer executable instructions to:
   receive training data to train the convolutional neural network that comprises one or more convolutional layers, in which each convolutional layer comprises input maps, convolutional kernels, and output maps;
   create, to optimize a convolution evaluation, a first perforation map to generate the output maps using a forward pass of a convolutional layer, the forward pass comprises a first set of convolution calculations of the input maps and the convolutional kernels, wherein the convolution calculations are selectively performed based on the first perforation map, the first perforation map indicates a first subset of the first set of convolution calculations to be performed and a second subset of the first set of convolution calculations to be skipped, the first perforation map is stochastically generated;
   create, to optimize the convolution evaluation, a second perforation map to determine gradients using a backward pass of the convolutional layer, the gradients determined based on a training error and a cost function associated with the convolutional neural network, the backward pass comprises a second set of convolution calculations of the output maps and the convolutional kernels, and wherein the convolution calculations are selectively performed based on the second perforation map, the second perforation map indicates a first subset of the second set of convolution calculations to be performed and a second subset of the second set of convolution calculations to be skipped, the second perforation map is stochastically generated, and the second perforation map being distinct from the first perforation map;

create, to optimize the convolution evaluation, a third perforation map to update the convolutional kernels using an update pass of the convolutional layer, the update pass comprises a third set of convolution calculations of the input maps and output maps, wherein the convolution calculations are selectively performed based on the third perforation map,. the third perforation map indicates a first subset of the third set of convolution calculations to be performed and a second subset of the third set of convolution calculations to be skipped, the third perforation map is stochastically generated, and the third perforation map being distinct from the first perforation map and the second perforation map; and iteratively repeat the forward pass, the backward pass, and the update pass until the convolutional neural network is trained, the first perforation map, the second perforation map, and the third perforation map being different for each iteration.

5. The computer product of claim 4, wherein:

wherein the first perforation map is a plurality of first perforation maps, wherein the forward pass uses a respective stochastically generated perforation map from the first perforation maps for each training sample;

the second perforation map is a plurality of second perforation maps, wherein the backward pass uses a respective stochastically generated perforation map from the second perforation maps for each training sample; and the third perforation map is a plurality of third perforation maps, wherein the update pass uses a respective stochastically generated perforation map from the third perforation maps for each training sample.

6. The computer product of claim 5, wherein:

a perforation map from the plurality of first perforation maps identifies spatial positions for which the forward pass skips performing convolution calculations and derives results using interpolation;

a perforation map from the plurality of second perforation maps identifies spatial positions for which the backward pass skips performing the convolution calculations and derives results using interpolation; and a perforation map from the plurality of third perforation maps identifies spatial positions for which the update pass skips performing the convolution calculations and derives results using interpolation.

\* \* \* \* \*